(12) United States Patent
Sakamoto

(10) Patent No.: US 11,906,446 B2
(45) Date of Patent: Feb. 20, 2024

(54) METHOD OF INSPECTING SURFACE AND SURFACE INSPECTION APPARATUS

(71) Applicant: HONDA MOTOR CO., LTD., Tokyo (JP)

(72) Inventor: Sanshiro Sakamoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 20 days.

(21) Appl. No.: 17/684,424

(22) Filed: Mar. 2, 2022

(65) Prior Publication Data
US 2022/0291149 A1 Sep. 15, 2022

(30) Foreign Application Priority Data
Mar. 9, 2021 (JP) ................... 2021-037624

(51) Int. Cl.
*G01N 23/083* (2018.01)
*G01N 23/18* (2018.01)
*G01N 23/16* (2018.01)

(52) U.S. Cl.
CPC ........... *G01N 23/083* (2013.01); *G01N 23/16* (2013.01); *G01N 23/18* (2013.01); *G01N 2223/643* (2013.01)

(58) Field of Classification Search
CPC ...... G01N 23/083; G01N 23/16; G01N 23/18; G01N 2223/643; G01N 21/8806; G01N 21/8851; G01N 21/8901; G01N 2021/8472; G01N 2223/61; G01N 2223/646; G01N 21/86; G01N 2021/845; G01N 2223/642; G01N 21/01; Y02P 70/50
See application file for complete search history.

(56) References Cited

U.S. PATENT DOCUMENTS

| | | | | |
|---|---|---|---|---|
| 10,222,342 | B2 * | 3/2019 | Ortner | G01N 21/892 |
| 10,935,503 | B2 * | 3/2021 | Marivoet | G01N 21/8806 |
| 2005/0045837 | A1 * | 3/2005 | Lavergne | H04N 1/4097 |
| | | | | 250/559.45 |
| 2008/0095669 | A1 * | 4/2008 | Kang | G01N 21/6452 |
| | | | | 436/172 |
| 2009/0220864 | A1 * | 9/2009 | Tanabe | G03F 1/84 |
| | | | | 430/5 |
| 2011/0310244 | A1 * | 12/2011 | Schweitzer | H02S 50/15 |
| | | | | 348/92 |
| 2012/0044346 | A1 * | 2/2012 | Chou | H01L 21/67288 |
| | | | | 348/E9.002 |

(Continued)

FOREIGN PATENT DOCUMENTS

| | | | | |
|---|---|---|---|---|
| DE | 102017110080 B4 * | 7/2019 | ......... | G01N 21/8806 |
| JP | H0658745 A | 3/1994 | | |

*Primary Examiner* — Marcus H Taningco
(74) *Attorney, Agent, or Firm* — CKC & Partners Co., LLC

(57) ABSTRACT

The present invention provides a method of inspecting a surface including detecting a presence or absence of a defect derived from a surface irregularity part of a planar inspection object to be conveyed in a predetermined direction, using a change in intensity of inspection light, the inspection light including at least two inspection lights that are parallel to a surface of the inspection object in a side view of the inspection object and pass over the surface of the inspection object or through the inspection object in a direction intersecting the conveyance direction in a plan view of the inspection object, the two inspection lights being non-parallel to each other in the plan view.

9 Claims, 5 Drawing Sheets

(56) References Cited

U.S. PATENT DOCUMENTS

2012/0307236 A1* 12/2012 Ortner ................ G01N 21/9505
356/239.3
2017/0343482 A1* 11/2017 Kaupp ............... G01N 21/8806

* cited by examiner

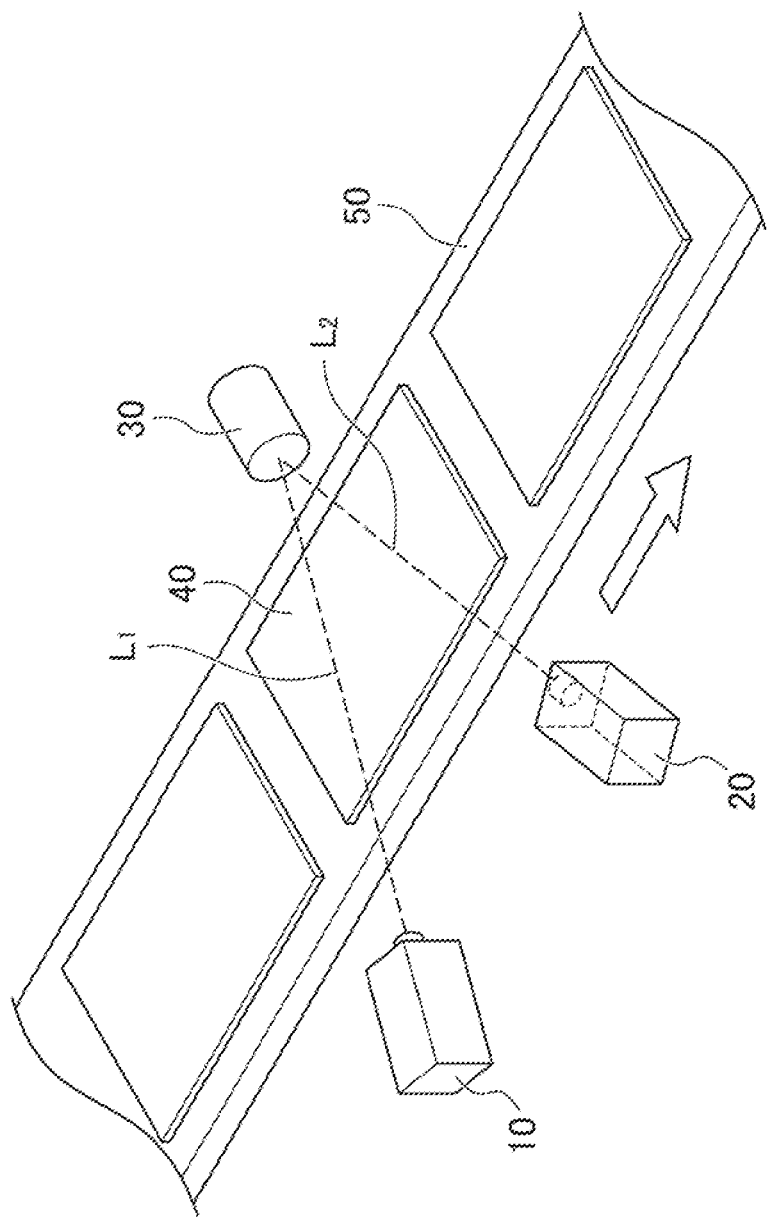

METHOD OF INSPECTING SURFACE AND SURFACE INSPECTION APPARATUS

This application is based on and claims the benefit of priority from Japanese Patent Application No. 2021-037624, filed on 9 Mar. 2021, the content of which is incorporated herein by reference.

BACKGROUND OF THE INVENTION

Field of the Invention

The present invention relates to a method of inspecting a surface and a surface inspection apparatus for detecting a presence or absence of a defect derived from a surface irregularity part of a planar inspection object to be conveyed in a predetermined direction, using a change in intensity of inspection light.

Related Art

In a planar inspection object, for example, a laminated body in which a predetermined composition is applied on a film or a metal foil to form a coating layer, defects such as foreign matters, wrinkles, and coating streaks formed on a coated surface after coating are required to be inspected. As an example, even in an electrode of a battery, an electrode current collector may be obtained by applying electrode composites containing an electrode active material to a current collector in a planar shape, or obtained by filling a metal porous body such as foamed metal with electrode composites. Even in such a case, it is necessary to inspect the planar electrode current collector for defects.

Image processing using a camera is generally used as a method of inspecting the planar inspection object while moving the inspection object in a flow direction. However, when a width of a product is wider than the field of view of the camera, a plurality of cameras may be required, and a plurality of high-resolution cameras need to be aligned.

In this regard, an inspection apparatus including a shield body, a light projection device, and an image capturing device is disclosed in Patent Document 1 described below in which the shield body covers a surface of an inspection product to form a minute gap with the inspection product, the light projection device irradiates the inside of the shield body with plate-shaped light from the minute gap, and the image capturing device is disposed above the inspection product 3. Thus, defects such as wrinkles and irregularities on the surface of a moving sheet-shaped material such as paper or cloth can be detected.

Patent Document 1: Japanese Unexamined Patent Application, Publication No. H06-56745

SUMMARY OF THE INVENTION

However, since the image capturing device is used and the shield body is required even in the inspection apparatus disclosed in Patent Document 1, there is a demand for a method of detecting defects with a simpler configuration.

The present invention has been made in view of the above problems, and is to provide an inspection method and an inspection apparatus capable of detecting a presence or absence of a defect derived from a surface irregularity part of a planar inspection object and a position where the defect is present, with a simple method.

The inventors have completed the present invention from findings that defects on surface irregularities can be easily detected and a position of an inspection object on an inspection plane can also be specified when inspection lights such as two or more lasers are disposed so as to have a predetermined positional relation. In other words, the present invention provides the following.

(1) A method of inspecting a surface including detecting a presence or absence of a defect derived from a surface irregularity part or an internal gap of a planar inspection object to be conveyed in a predetermined direction, using a change in intensity of inspection light, the inspection light including at least two inspection lights that are parallel to a surface of the inspection object in a side view of the inspection object and pass over the surface of the inspection object or through the inspection object in a direction intersecting the conveyance direction in a plan view of the inspection object, the two inspection lights being non-parallel to each other in the plan view.

According to the invention of (1), it is possible to measure not only the position coordinates in the conveyance direction (flow direction) but also the position coordinates in the direction (width direction) perpendicular to the conveyance direction, using inspection lights that are non-parallel to each other. Further, image processing for arranging cameras side by side is not required, and the apparatus is very simple, so that a low-cost inspection method is provided.

(2) The surface inspection method according to (1), further including:

specifying coordinates, in the conveyance direction, of a position where the defect is present in a plane on the surface of the inspection object, using a timing at which the intensity of the inspection light changes; and specifying coordinates, in a direction orthogonal to the conveyance direction, of the position where the defect is present in the plane on the surface of the inspection object, using a difference in timings at which the intensity of the two inspection lights changes.

According to the invention of (2), the position coordinates on the plane of the inspection object can be easily specified only from the timing P at which the intensities of the two inspection lights change and the time t of the difference. Since the amount of information is extremely small compared to the image processing of the camera, the data processing time is also shortened, and the inspection object can be conveyed at a higher speed to be inspected in a short time.

(3) The surface inspection method according to (1) or (2), in which the inspection light is laser light, passes in a state of being separated by a predetermined distance from the surface of the inspection object except for a surface protrusion part, and is used to detect a defect derived from the surface protrusion part based on a change of the intensity in the surface protrusion part.

According to the invention of (3), by using the laser light that is converging light such as visible light, ultraviolet light, or infrared light, it is possible to detect a change in intensity caused by the surface protrusion part.

(4) The surface inspection method according to (1) or (2), in which the inspection light is X-ray light, passes through an interior of a surface layer of the inspection object except for the surface recess part or the internal gap, and is used to detect a defect derived from the surface recess part or the internal gap based on a change of the intensity in the surface recess part or the internal gap.

According to the invention of (4), by using X-rays having high transmission, it is possible to detect a change in intensity caused by the surface recess part or the internal gap (void).

(5) The surface inspection method according to any one of (1) to (4), in which the inspection object is a wound body of a sheet-shaped material,
the sheet-shaped material is pulled out with a predetermined tension from the wound body, and is wound through two guide rollers, and
the inspection light passes over the surface of the inspection object or through the inspection object between the guide rollers.

According to the invention of (5), since the inspection object can be maintained in a plane state between the guide rollers, the inspection object of the sheet-shaped material can be prevented from fluttering and inspection accuracy can be improved.

(6) The surface inspection method according to (5), in which a conveyance speed of the inspection object is reduced between the guide rollers.

According to the invention of (6), by reducing the moving speed of the inspection object at the time of inspection, the inspection object can be prevented from fluttering and inspection accuracy can be improved.

(7) The surface inspection method according to any one of (1) to (6), in which the two inspection lights are disposed so as to be positioned line-symmetrically with respect to a virtual straight line along a width direction in the plan view.

(8) A surface inspection apparatus configured to detect a presence or absence of a defect derived from a surface irregularity part or an internal gap of a planar inspection object to be conveyed in a predetermined direction, using a change in intensity of inspection light, the surface inspection apparatus including:
a conveyor capable of conveying the planar inspection object in the predetermined direction;
a first light emitter and a second light emitter capable of emitting at least two inspection lights so as to be non-parallel to each other in a plan view, the at least two inspection lights being parallel to a surface of the inspection object in a side view of the inspection object and passing over the surface of the inspection object or through the inspection object in a direction intersecting the conveyance direction in the plan view of the inspection object; and
a light receiver configured to detect a change in intensity of each of the inspection lights.

According to the invention of (8), the same effect as that in the invention of (1) can be obtained, image processing for arranging cameras side by side is not required, and a simple and low-cost inspection device can be provided.

(9) The surface inspection apparatus according to (8), further including a coordinate specifier configured to: specify coordinates, in the conveyance direction, of a position where the defect is present in a plane on the surface of the inspection object, using a timing at which the intensity of the inspection light changes, and specify coordinates, in a direction orthogonal to the conveyance direction, of the position where the defect is present in the plane on the surface of the inspection object, using a difference in timings at which the intensity of the two inspection lights changes.

According to the invention of (9), the same effect as that in the invention of (2) can be obtained, and since the amount of information required for specifying the coordinates is extremely small compared to the image processing of the camera, the data processing time is also shortened, and the inspection object can be conveyed at a higher speed to be inspected in a short time.

(10) The surface inspection apparatus according to (8) or (9), in which the inspection object is a wound body of a sheet-shaped material,
the conveyor includes an unwinder that pulls out the sheet-shaped material from the wound body, a winder that winds up the pulled sheet-shaped material, a tension adjuster capable of adjusting a tension of the pulled sheet-shaped material, and two guide rollers disposed between the unwinder and the winder, and
the first light emitter and the second light emitter are disposed such that the inspection light passes over the surface of the inspection object or through the inspection object between the guide rollers.

According to the invention of (10), the same effect as that in the invention of (5) can be obtained, and since the inspection object can be maintained in a plane state between the guide rollers, the inspection object of the sheet-shaped material can be prevented from fluttering and inspection accuracy can be improved.

(11) The surface inspection apparatus according to (10), in which the two inspection lights are disposed so as to be positioned line-symmetrically with respect to a virtual straight line along a width direction in the plan view.

BRIEF DESCRIPTION OF THE DRAWINGS

FIG. 1 is a schematic diagram showing an embodiment of a method of inspecting a surface and a surface inspection apparatus of the present invention;

DETAILED DESCRIPTION OF THE INVENTION

Figure 2A:
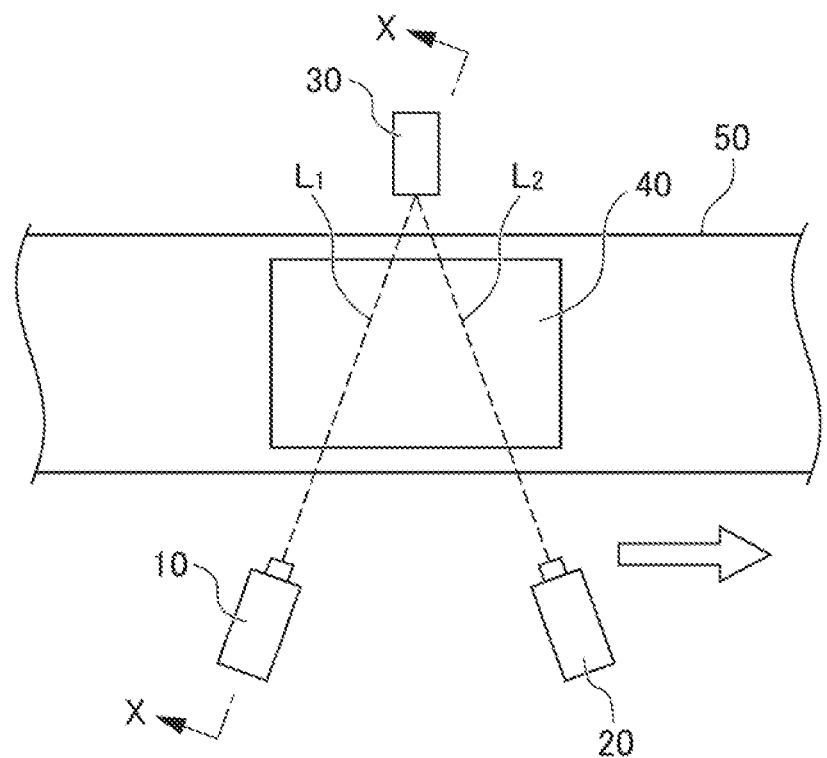
FIG. 2A is a plan view of FIG. 1.

An embodiment of the present invention will be described below with reference to the drawings. Contents of the present invention are not limited to the following descriptions of embodiments.

<Surface Inspection Apparatus>

As shown in FIG. 1, a surface inspection apparatus according to the present embodiment includes a planar inspection object 40, a conveyor 50 that conveys the inspection object 40, a first light emitter 10 capable of emitting first inspection light $L_1$, a second light emitter 20 capable of emitting second inspection light $L_2$, a light receiver 30, and a coordinate specifier (not shown). Hereinafter, each component will be described, but the coordinate specifier will be described in a surface inspection method to be described below.

(Inspection Object)

The inspection object 40 has a planar shape as a whole, and a surface irregularity part to be detected exists on a surface to be inspected of the inspection object 40. More specifically, examples of the surface irregularity part include a defect 41 (a surface protrusion part) shown in FIG. 2B and a defect 42 (a surface recess part) shown in FIG. 5.

The inspection object 40 may be a plate-shaped member as shown in FIG. 1, or a sheet-shaped material unwound from a wound body formed by roll-to-roll processing.

An example of the inspection object 40 includes an electrode current collector obtained by applying electrode composites containing an electrode active material to a current collector such as a metal foil in a planar shape, or an electrode current collector obtained by filling a metal porous body such as foamed metal with electrode composites, but is not limited to such an electrode current collector.

(Conveyor)

An example of the conveyor 50 includes, for example, a known conveyance device capable of conveying the inspection object at a predetermined conveyance speed, such as a belt conveyor capable of conveying the inspection object 40, but is not particularly limited. When the inspection object 40 is the wound body described above, as the conveyor, a conventionally known rewinding device can be used that unwinds a sheet from one wound body and winds the sheet on the other wound body after the inspection.

(First Light Emitter and Second Light Emitter)

The first light emitter 10 and the second light emitter 20 are light-emitting devices capable of emitting laser light as inspection light in the present embodiment. The inspection light preferably uses converging light such as laser light. By using laser light that is converging light such as visible light, ultraviolet light, or infrared light, it is possible to detect a change in intensity caused by the surface protrusion part.

Figure 2B:
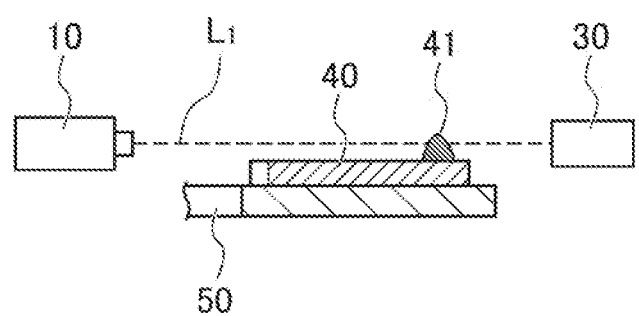
FIG. 2B is a side view showing an X-X cross section in FIG. 2A.

With reference to FIGS. 2A and 2B in addition to FIG. 1, according to the present embodiment, each of the first light emitter 10 and the second light emitter 20 are arranged in pairs with the light receiver 30. In other words, the first inspection light $L_1$ is emitted from the first light emitter 10, and the intensity change of the first inspection light $L_1$ is measured with time by the light receiver 30. Similarly, the second inspection light $L_2$ is emitted from the second light emitter 20, and the intensity change of the second inspection light $L_2$ is measured with time by the same light receiver 30.

(Light Receiver)

The light receiver 30 is not particularly limited as long as it can detect the intensity of the laser light with time. A conventionally known laser sensor can be appropriately used.

In the present embodiment, the inspection lights from the first light emitter 10 and the second light emitter 20 are received by the same light receiver 30, but may be each received by separate light receivers, without being limited thereto. In the present embodiment, the first light emitter 10 and the second light emitter 20 use the same laser having the same wavelength, but may use different lasers having different wavelengths without being limited thereto.

(Arrangement of First Light Emitter and Second Light Emitter)

As shown in FIGS. 2A and 2B, the first light emitter 10 and the second light emitter 20 are arranged so as to be parallel to the surface of the inspection object 40 in a side view of the inspection object 40. As a result, as shown in FIG. 2B, the inspection light and the inspection object 40 are arranged with a predetermined separation distance. The separation distance can be appropriately set depending on a size (height) of the defect 41 from the viewpoint of detecting the defect 41 which is the surface protrusion part.

In a plan view of the inspection object 40 as shown in FIG. 2A, the first light emitter 10 and the second light emitter 20 are arranged such that first inspection light $L_1$ and the second inspection light $L_2$ intersect a conveyance direction indicated by an arrow in the drawing. Thus, since the inspection lights are arranged to straddle the entire inspection object 40 in a width direction, even when a defect part is located in any position in the width direction of the inspection object 40, the inspection light inevitably passes through the defect part.

Figure 3:
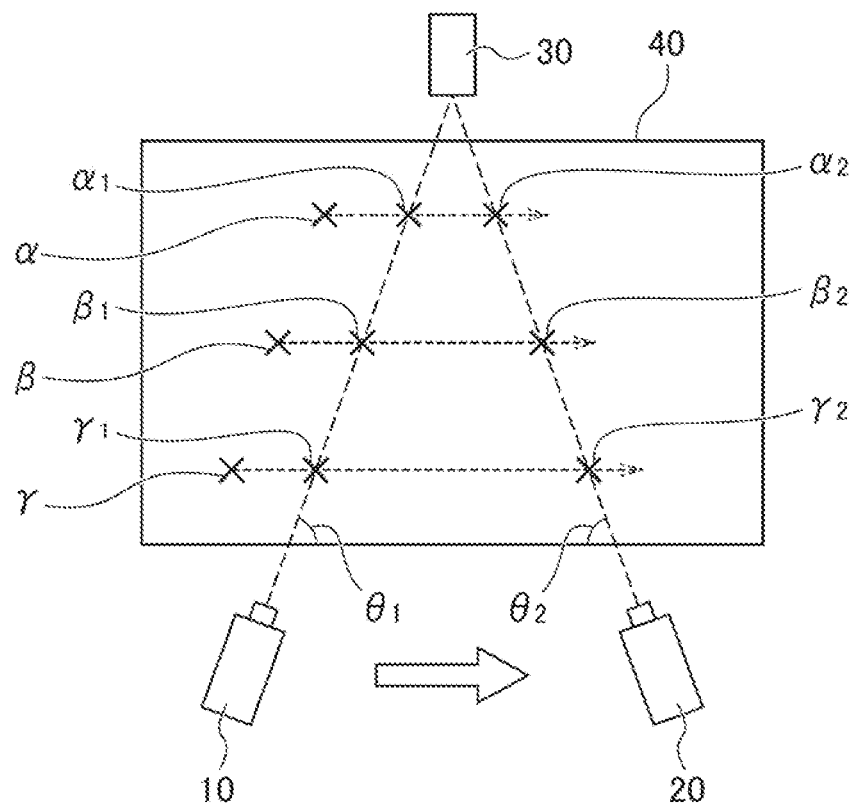
FIG. 3 is an enlarged plan view of an inspection area in FIG. 2A.

Here, according to the present invention, the first inspection light $L_1$ and the second inspection light $L_2$ are arranged so as to be non-parallel to each other. In the present embodiment, as shown in FIG. 3, the first inspection light $L_1$ forms an angle $\theta_1$ in the conveyance direction, and the second inspection light $L_2$ forms an angle $\theta_2$ in the conveyance direction. The non-parallel means that angles $\theta_1$ and $(180-\theta_2)$ are different from each other. In the present invention, the angles $\theta_1$ and $\theta_2$ may be set such that the light $L_1$ and the light $L_2$ are non-parallel to each other, or one of the angles may be 90 degrees, but the angles $\theta_1$ and $\theta_2$ are preferably equal to each other (angle $\theta_1$=angle $\theta_2$) in a plan view such that the light $L_1$ and $L_2$ are arranged in line symmetrical positions with respect to a virtual straight line in the width direction.

<Surface Inspection Method>

A method of inspecting a surface according to an exemplary embodiment of the present invention using the surface inspection apparatus described above will be described below with reference to FIGS. 3 and 4. FIG. 3 is an enlarged plan view of the inspection area shown in FIG. 2A, and FIG. 4 is a conceptual diagram showing measurement results of time-intensity (received light intensity level) indicating a change of a received light intensity level in the light receiver shown in FIG. 3.

In FIG. 3, reference symbols α, β, and γ represent defect parts in which the defect 41 of the surface protrusion part shown in FIG. 2B is present (indicated by a symbol × in the drawing). In this state, the inspection object 40 moves in a direction of an arrow in the drawing at a conveyance speed V. At this time, when the defect parts α, β, and γ pass through two positions on a scanning line of the first inspection light $L_1$ and a scanning line of the second inspection light $L_2$, the laser light is blocked, so that detection intensity of the light receiver 30 is reduced.

Figure 4:
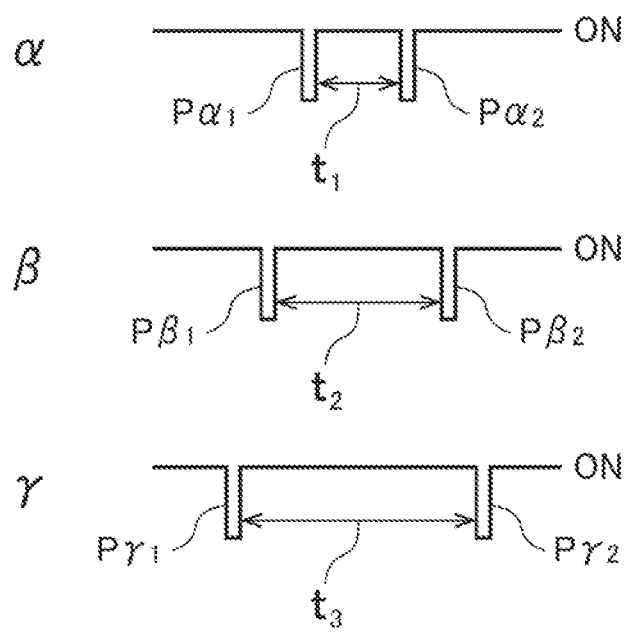
FIG. 4 is a conceptual diagram showing measurement results of time-intensity that indicates a change of a received light intensity level in a light receiver shown in FIG. 3.

FIG. 4 shows intensity changes in the light receiver 30 derived from the defects α, β, and γ at this time, respectively. In FIG. 4, a horizontal axis indicates a time, and a vertical axis indicates a received light intensity. In the drawing, a symbol ON indicates a received light intensity level when there is no defect part, and in positions $P_{\alpha 1}$, $P_{\alpha 2}$, $P_{\beta 1}$, $P_{\beta 2}$, $P_{\gamma 1}$, and $P_{\gamma 2}$, the laser light is blocked by the defect 41 and the received light intensity level is reduced. In the present embodiment, since there is one light receiver 30, a peak obtained by overlapping and addition of the intensity of the first inspection light $L_1$ and the intensity of the second inspection light $L_2$ is detected by the light receiver 30. However, when a light receiver is provided separately for each inspection light, only the positions $P_{\alpha 1}$, $P_{\beta 1}$, and $P_{\gamma 1}$ are detected in a first light receiver, and only the positions $P_{\alpha 2}$, $P_{\beta 2}$, and $P_{\gamma 2}$ are detected in a second light receiver.

A method of obtaining in-plane position coordinates of the defects α, β, and γ on the surface of the inspection object 40 will be described with reference to FIGS. 3 and 4 together. A program for executing the method corresponds to the coordinate specifier in the surface inspection apparatus of the present invention.

First, the position coordinates of the defects α, β, and γ in the conveyance direction (flow direction) can be obtained more directly than times of $P_{α1}$, $P_{α2}$, $P_{β1}$, $P_{β2}$, $P_{γ1}$, and $P_{γ2}$ that represent intensity change positions in FIG. 4, respectively. In this case, it is sufficient to detect: any one of P1 and P2, but both of P1 and P2 may be detected.

In the present invention, since a width W of each P corresponds to the size of the defect 41 in the width direction, the size of the defect part can be estimated from such information. For example, when there are large defects such as large streaky coating irregularity and wrinkles associated with coating, the width W becomes large, so that it can also be used to estimate the type of defect.

Next, for example, when the defects α, β, and γ are present in the direction (width direction) of the defect part orthogonal to the conveyance direction, from the defect α, the Pus in FIG. 4 is detected at a position at in FIG. 3, the $P_{α2}$ is detected at a position $α_2$, and a difference $t_1$ is detected as a result. Similarly, from the defect β, the $P_{β1}$ is detected at a position $β_1$, the $P_{β2}$ is detected at a position $β_2$, and a difference $t_2$ is detected. Similarly, from the defect γ, the $P_{γ1}$ is detected at a position $γ_1$, the $P_{γ2}$ is detected at a position $γ_2$, and a difference $t_3$ is detected.

For the differences $t_1$, $t_2$, and $t_3$, when the time $t_N$ is small, the defect part is located on an upper side in FIG. 3 (closer to the light receiver 30), and when the time $t_N$ is large, the defect part is located on a lower side in FIG. 3 (closer to the first: light emitter 10 and the second light emitter 2), whereby there is a correlation of a linear relationship between the time $t_N$ and the position coordinates in the width direction. Therefore, the position coordinates in the width direction can be specified by obtaining a linear relational expression between the time $t_N$ and the position coordinates in the width direction at a predetermined conveyance speed in advance.

As described above, according to the present invention, the position coordinates on the plane of the inspection object can be easily specified only from the timing P at which the two inspection lights change in intensity and the time to of the difference, and the defect part can be grasped with a simple method.

(Modification)

Figure 5:
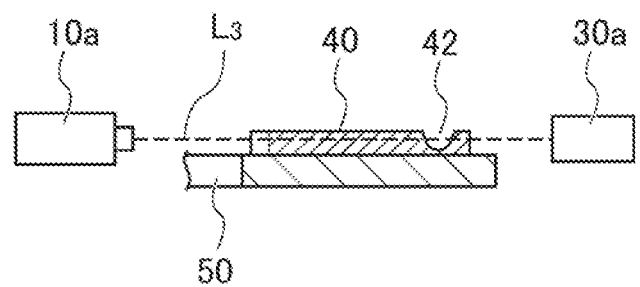
FIG. 5 is a side cross-sectional view showing a modification of FIG. 2B.

FIG. 5 shows a modification that is different from the embodiment described above in that first inspection light $L_3$ and second inspection light $L_4$ (not shown) are emitted by a first light emitter 10*a*, a second light emitter 20*a* (not shown), a light receiver 30*a* using X-rays as inspection light, instead of the first light emitter 10, the second light emitter 20, the light receiver 30 using the laser light as the inspection light.

X-rays have high transmission of substances, but have different received light intensity levels depending on whether the X-rays pass through the inspection object 40 or pass through a space caused by a recess part and a gap such as a void. Therefore, as shown in FIG. 5, the light receiver 30*a* can detect a change in X-ray intensity caused by the defect 42 as a surface recess part and the gap (not shown) when the X-rays are emitted so as to pass through a surface layer in the inspection object 40.

In the present invention, the inspection by laser light and the inspection by X-rays may be used in combination. In this case, for example, a combination of the first light emitter 10, the second light emitter 20, and the light receiver 30 using the laser light and a combination of the first light emitter 10*a*, the second light emitter 20*a* (not shown), and the light receiver 30*a* using X-rays may be disposed such that the inspection lights overlap in a plan view (being aligned up and down in a vertical direction of the inspection surface). Thereby, the inspection position can be set to one in the plan view, so that the inspection space can be made smaller. In a case of a roll-to-roll method to be described below, it is possible to narrow an area where a constant tension needs to be applied in order to prevent fluttering.

Figure 6A:
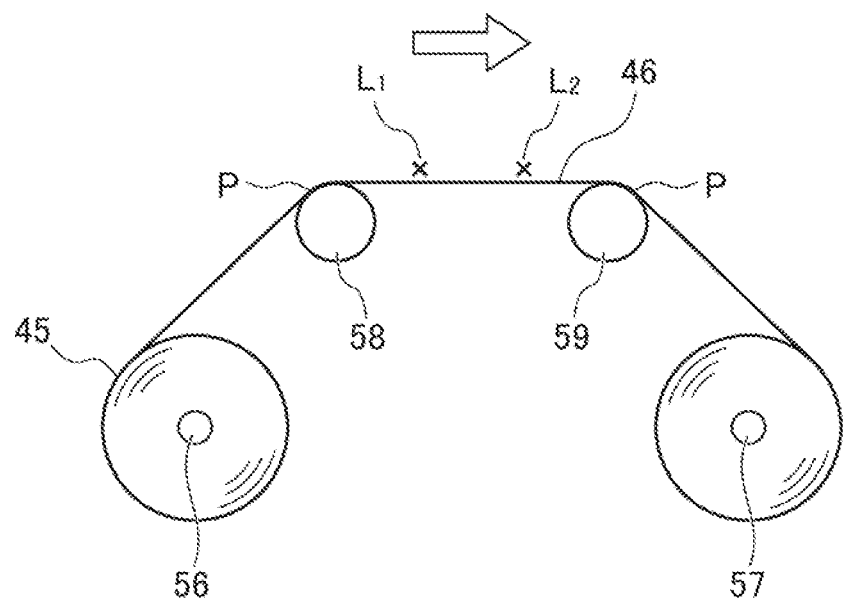
FIG. 6A is a schematic diagram showing another embodiment of a method of inspecting a surface and a surface inspection apparatus of the present invention.
Figure 6B:
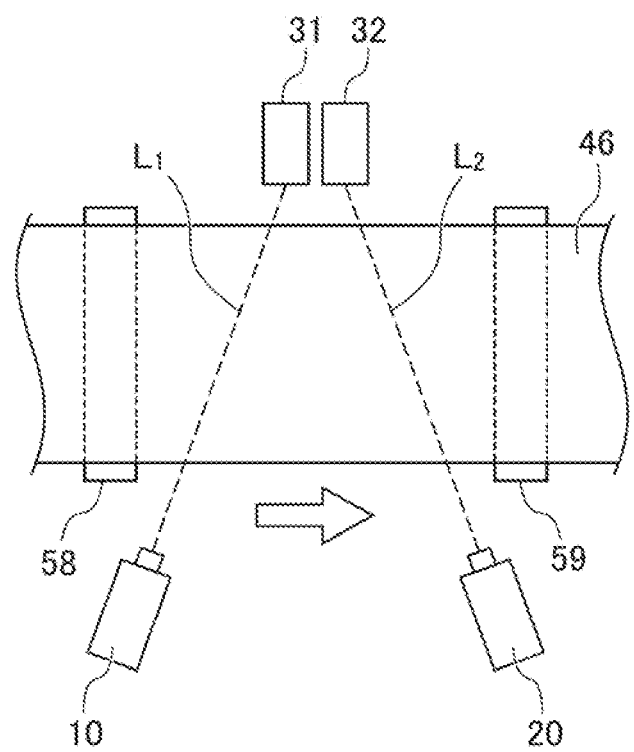
FIG. 6B is a schematic diagram showing further another embodiment of a method of inspecting a surface and a surface inspection apparatus of the present invention.

FIGS. 6A and 6B are schematic diagrams showing another embodiment of a method of inspecting a surface and a surface inspection apparatus of the present invention, and show the case of the roll-to-roll described above. FIG. 6A is a side view, and FIG. 6B is an enlarged plan view of the vicinity of the inspection portion. In this embodiment, the inspection object is a wound body 45 of a sheet-shaped material 46. A conveyor 50 includes an unwinder 56 that pulls out the sheet-shaped material 46 from the wound body 45, a winder 57 that winds up the pulled sheet-shaped material 46, and a tension adjuster (not shown) that can adjust a tension of the pulled sheet-shaped material 46. Then, two guide rollers 58 and 59 parallel to each other are disposed between the unwinder 56 and winder 57. The guide rollers 58 and 59 are disposed at positions relatively higher than the unwinder 56 and the winder 57, whereby the sheet-shaped material 46 is held by the guide rollers 58 and 59 and abuts at positions P.

A first light emitter 10 and a first light receiver 31, and a second light emitter 20 and a second light receiver 32, are disposed such that inspection lights $L_1$ and $L_2$ pass over the surface of the sheet-shaped material 46 or through the sheet-shaped material 46 in a plan view between the guide rollers 58 and 59. The sheet-shaped material 46 is adjusted to have a predetermined tension between the two guide rollers 58 and 59, whereby planarity can be maintained and the inspection object can be prevented from fluttering in the vertical direction with respect to the plane. As a result, the inspection light can be emitted in parallel with the sheet-shaped material 46, and a predetermined separation distance between the inspection light and the inspection object is kept constant, so that inspection accuracy is improved. At this time, it is possible to further prevent fluttering by shortening the distance between the guide rollers.

In the aspect of the present invention described above, two guide rollers that are non-parallel to each other may be provided instead of the two parallel guide rollers, and the first light emitter and the second light emitter may be disposed such that the inspection light is parallel to an axial direction of the guide rollers and passes over the surface of the inspection object or through the inspection object at positions where the inspection object abuts on the surfaces of the guide rollers. According to such an aspect, since the sheet-shaped material is held by the guide rollers and abuts on the guide rollers, fluttering is prevented with high accuracy. As a result, the inspection light can be emitted in parallel with the sheet-shaped material, and the predetermined separation distance between the inspection light and the inspection object is kept constant, so that inspection accuracy is improved.

Although the preferred embodiment: of the present invention has been described above, the content of the present invention is not limited to the above-described embodiment and can be changed as appropriate.

EXPLANATION OF REFERENCE NUMERALS 10 first light emitter (laser light)
10a first light emitter (X-ray)
20 second light emitter (laser light)
20a second light emitter (X-ray)
30 light receiver (laser light)
30a light receiver (X-ray)
40 inspection object
41 defect (surface protrusion part)
42 defect (surface recess part)
50 conveyor
$L_1$ first inspection light (laser light)
$L_2$ second inspection light (laser light)
$L_3$ first inspection light (X-ray)
$t_1, t_2, t_3$ difference in timings
$\alpha, \beta, \gamma$ defect
$\alpha_1, \beta_1, \gamma_1$ distance
$\theta_1, \theta_2$ angle
$P_{\alpha 1}, P_{\alpha 2}, P_{\beta 1}, P_{\beta 2}, P_{\gamma 1}, P_{\gamma 2}$ intensity change position

What is claimed is:

1. A method of inspecting a surface, comprising detecting a presence or absence of a defect derived from a surface irregularity part or an internal gap of a planar inspection object to be conveyed in a predetermined direction, using a change in intensity of inspection light,
the inspection light including at least two inspection lights that are parallel to a surface of the inspection object in a side view of the inspection object and pass over the surface of the inspection object or through the inspection object in a direction intersecting the conveyance direction in a plan view of the inspection object,
the two inspection lights being non-parallel to each other in the plan view,
the method further comprising specifying a position where the defect is present in a plane on the surface of the inspection object from coordinates in the conveyance direction specified by using a timing at which the intensity of the inspection light changes, and coordinates in a direction orthogonal to the conveyance direction specified by using a difference in timings at which the intensity of the two inspection lights changes.

2. The surface inspection method according to claim 1, wherein the inspection light is laser light, passes in a state of being separated by a predetermined distance from the surface of the inspection object except for a surface protrusion part, and is used to detect a defect derived from the surface protrusion part based on a change of the intensity in the surface protrusion part.

3. The surface inspection method according to claim 1, wherein the inspection light is X-ray light, passes through an interior of a surface layer of the inspection object except for the surface recess part or the internal gap, and is used to detect a defect derived from the surface recess part or the internal gap based on a change of the intensity in the surface recess part or the internal gap.

4. The surface inspection method according to claim 1, wherein the inspection object is a wound body of a sheet-shaped material,
the sheet-shaped material is pulled out with a predetermined tension from the wound body, and is wound through two guide rollers, and
the inspection light passes over the surface of the inspection object or through the inspection object between the guide rollers.

5. The surface inspection method according to claim 4, wherein a conveyance speed of the inspection object is reduced between the guide rollers.

6. The surface inspection method according to claim 1, wherein the two inspection lights are disposed so as to be positioned line-symmetrically with respect to a virtual straight line along a width direction in the plan view.

7. A surface inspection apparatus configured to detect a presence or absence of a defect derived from a surface irregularity part or an internal gap of a planar inspection object to be conveyed in a predetermined direction, using a change in intensity of inspection light, the surface inspection apparatus comprising:
a conveyor capable of conveying the planar inspection object in the predetermined direction;
a first light emitter and a second light emitter capable of emitting at least two inspection lights so as to be non-parallel to each other in a plan view, the at least two inspection lights being parallel to a surface of the inspection object in a side view of the inspection object and passing over the surface of the inspection object or through the inspection object in a direction intersecting the conveyance direction in the plan view of the inspection object;
a light receiver configured to detect a change in intensity of each of the inspection lights; and
a coordinate specifier that specifies a position where the defect is present in a plane on the surface of the inspection object from coordinates in the conveyance direction specified by using a timing at which the intensity of the inspection light changes, and coordinates in a direction orthogonal to the conveyance direction specified by using a difference in timings at which the intensity of the two inspection lights changes.

8. The surface inspection apparatus according to claim 7, wherein the inspection object is a wound body of a sheet-shaped material,
the conveyor includes an unwinder that pulls out the sheet-shaped material from the wound body, a winder that winds up the pulled sheet-shaped material, a tension adjuster capable of adjusting a tension of the pulled sheet-shaped material, and two guide rollers disposed between the unwinder and the winder, and
the first light emitter and the second light emitter are disposed such that the inspection light passes over the surface of the inspection object or through the inspection object between the guide rollers.

9. The surface inspection apparatus according to claim 8, wherein the two inspection lights are disposed so as to be positioned line-symmetrically with respect to a virtual straight line along a width direction in the plan view.

* * * * *